US010508665B2

(12) United States Patent
Kojima et al.

(10) Patent No.: US 10,508,665 B2
(45) Date of Patent: Dec. 17, 2019

(54) CYLINDER DEVICE

(71) Applicant: KOSMEK LTD., Hyogo (JP)

(72) Inventors: Ryota Kojima, Hyogo (JP); Masahiro Yoshimi, Hyogo (JP); Hideaki Yokota, Hyogo (JP)

(73) Assignee: KOSMEK LTD., Hyogo (JP)

( * ) Notice: Subject to any disclaimer, the term of this patent is extended or adjusted under 35 U.S.C. 154(b) by 176 days.

(21) Appl. No.: 15/555,699

(22) PCT Filed: Apr. 6, 2016

(86) PCT No.: PCT/JP2016/061311
§ 371 (c)(1),
(2) Date: Sep. 5, 2017

(87) PCT Pub. No.: WO2016/167169
PCT Pub. Date: Oct. 20, 2016

(65) Prior Publication Data
US 2018/0051723 A1 Feb. 22, 2018

(30) Foreign Application Priority Data

Apr. 13, 2015 (JP) .................................. 2015-093560
Jul. 13, 2015 (JP) .................................. 2015-151293

(51) Int. Cl.
F15B 15/28 (2006.01)
B23Q 3/06 (2006.01)

(52) U.S. Cl.
CPC ................ F15B 15/28 (2013.01); B23Q 3/06 (2013.01); F15B 15/2807 (2013.01)

(58) Field of Classification Search
CPC .................... F15B 15/2807; B23Q 17/003
See application file for complete search history.

(56) References Cited

U.S. PATENT DOCUMENTS

2014/0138890 A1 5/2014 Kawakami
2016/0271758 A1* 9/2016 Kawakami ............. B25B 5/062
2017/0198729 A1* 7/2017 Kitaura .................. F15B 15/14

FOREIGN PATENT DOCUMENTS

JP 2014108490 A 6/2014
JP 2015 042880 A 3/2015
WO 2014 087756 A1 6/2014

OTHER PUBLICATIONS

Office Action dated Nov. 30, 2018, in corresponding European application No. 16779960.0.
Search Report dated Jul. 19, 2019, in corresponding European application No. 16779960.0.

* cited by examiner

Primary Examiner — F Daniel Lopez
(74) Attorney, Agent, or Firm — Bacon & Thomas, PLLC

(57) ABSTRACT

In a rod hole (19) of a holding rod (18) held in a guide hole (17) of a piston (10), a limit switch (20) is fixed and a detection rod (21) is inserted. A first engagement ball (30) and a second engagement ball (40) are configured to be in contact with a first cam surface (32) and a second cam surface (42), respectively, which are provided at an outer periphery of the detection rod (21). The first engagement ball (30) and the second engagement ball (40) are configured to be in contact with a first pushing portion (35) and a second pushing portion (45), respectively, which are provided inside the guide hole (17). The position of the piston (10) is detected by electrically or electronically detecting the movement of the detection rod (21) by the limit switch (20).

5 Claims, 7 Drawing Sheets

CYLINDER DEVICE

TECHNICAL FIELD

The present invention relates to a cylinder device having a function of detecting the position of a piston or the like.

BACKGROUND ART

Known examples of such a cylinder device having the position detection function include a device described in Patent Literature 1 (Japanese Unexamined Patent Publication No. 2014-108490).

A first embodiment (see FIG. 2 and FIG. 5) of the above known art is structured as follows.

A piston is inserted into a housing, and a lock chamber is provided above the piston, while a release chamber is provided below the piston. The piston is raised when pressurized oil is discharged from the lock chamber and pressurized oil is supplied to the release chamber. By the pressurized oil supplied to the release chamber, a valve body of a detection-purpose on-off valve to detect the position of the piston is switched from an open position (upper position) to a closed position (lower position), and the valve body closes an air detection passage through which detection-purpose air is supplied. Then, a pressure switch detects a pressure rise at an upstream side of the closed air detection passage, and thereby detects that the piston is at a raised position.

Meanwhile, a third embodiment (see FIG. 11 and FIG. 13) of the above known art is structured as follows.

A compression spring biasing the valve body downward is attached to an upper portion of the valve body. When pressurized oil is discharged from the release chamber on the lower side and pressurized oil is supplied to the lock chamber on the upper side, the piston is lowered. As a result, the valve body of the detection-purpose on-off valve is closed by the biasing force of the compression spring. Then, similarly to the above-mentioned first embodiment, the pressure switch detects a pressure rise at the upstream side of the air detection passage, and thereby detects that the piston is at a lowered position.

CITATION LIST

Patent Literature

Patent Literature 1: Japanese Unexamined Patent Publication No. 2014-108490

SUMMARY OF INVENTION

Technical Problem

In the above-mentioned device, a relatively long pipe is provided between the pressure switch, provided to the air detection passage, and a compressed air source. Due to this, in the above known art, when the valve body of the detection-purpose on-off valve is switched from the open state to the closed state, it may take few seconds for the pressure at the upstream side of the air detection passage to exceed a predetermined pressure. That is, it can take time to detect the position of the piston.

An object of the present invention is to provide a cylinder device configured so that the position of a piston or the like is quickly detected.

Solution to Problem

In order to achieve the above object, in a first aspect of the present invention, a cylinder device is structured as follows, for example, as shown in FIG. 1 and FIG. 2.

A piston 10 is inserted into a housing 1. A guide hole 17 is provided in the piston 10 so as to open downward. A holding rod 18 to be held in the guide hole 17 is provided to protrude upward from a lower wall 4a of the housing 1. An electric or electronic switch 20 is fixed to a middle-lower portion of a rod hole 19, which is provided in the holding rod 18 so as to extend in an up-down direction. A detection rod 21 provided to detect a position of the piston 10 is inserted ascendably and descendably into a middle-upper portion of the rod hole 19. A plurality of support holes 22, 22 are provided radially in the holding rod 18 at predetermined intervals with respect to a circumferential direction of the holding rod 18. A first engagement ball 30 and a second engagement ball 40 are respectively inserted into the support holes 22, 22 so as to be movable. A first cam surface 32 configured to be in contact with the first engagement ball 30 is provided at an outer periphery of the detection rod 21 so that a distance between the first cam surface 32 and an axis of the detection rod 21 increases upward. A first pushing portion 35 configured to be in contact with the first engagement ball 30 is provided inside the guide hole 17 so that a distance between the first pushing portion 35 and the axis decreases upward. A second cam surface 42 configured to be in contact with the second engagement ball 40 is provided at the outer periphery of the detection rod 21 so that a distance between the second cam surface 42 and the axis decreases upward. A second pushing portion 45 configured to be in contact with the second engagement ball 40 is provided inside the guide hole 17 so that a distance between the second pushing portion 45 and the axis increases upward. The position of the piston 10 is detected by electrically or electronically detecting movement of the detection rod 21 by the switch 20.

In the first aspect, the following functions and effects are provided.

When the piston is raised from a lowered position to a raised position, the second pushing portion of the piston lowers the detection rod via the second engagement ball and the second cam surface. As a result, the detection rod quickly operates the electric or electronic switch.

Meanwhile, when the piston is lowered from the raised position to the lowered position, the first pushing portion raises the detection rod via the first engagement ball and the first cam surface. As a result, the detection rod quickly stops operating the electric or electronic switch.

Because the switch is an electric or electronic switch, it has quick responsivity. Due to this, the switch quickly detects that the piston is at the lowered position and quickly detects that the piston is at the raised position.

It is preferable to incorporate the following feature (1) and/or feature (2) into the first aspect of the invention.

(1) As shown in FIG. 3 and FIG. 4, for example, the switch 20 includes an operated component 20b hermetically inserted into the rod hole 19 so as to be biased upward and so as to be movable in the up-down direction.

In this arrangement, because the operated component is hermetically inserted into the rod hole, the operation of the detection rod is stabilized.

(2) As shown in FIG. 5, for example, the piston 10 includes a piston main body 10a and a guide cylinder 10b protruding downward from the piston main body 10a. A sealing member 47 is attached between an inner peripheral surface of a cylindrical bore 4b of the housing 1 and an outer peripheral surface of the guide cylinder 10b.

This arrangement allows the detection rod to be moved with a smaller force.

In order to achieve the above object, in a second aspect of the present invention, a cylinder device is structured as follows, for example, as shown in FIG. 6A and FIG. 6B.

A piston 10 is inserted into a housing 1. A guide hole 17 is provided in the piston 10 so as to open downward. A holding rod 18 to be held in the guide hole 17 is provided to protrude upward from a lower wall 4a of the housing 1. An electric or electronic switch 20 is fixed to a middle-lower portion of a rod hole 19, which is provided in the holding rod 18 so as to extend in an up-down direction. An operated component 20b of the switch 20 is inserted into the rod hole 19 so as to be biased upward and so as to be movable in the up-down direction. A detection rod 21 provided to detect a position of the piston 10 is inserted ascendably and descendably into a middle-upper portion of the rod hole 19. A spring 60 attached to an upper portion of the rod hole 19 biases the detection rod 21 downward against a force biasing the operated component 20b upward. A support hole 22 is provided radially in the holding rod 18. An engagement ball 30 is inserted into the support hole 22 so as to be movable. A cam surface 32 configured to be in contact with the engagement ball 30 is provided at an outer periphery of the detection rod 21 so that a distance between the cam surface 32 and an axis of the detection rod 21 increases upward. A pushing portion 35 configured to be in contact with the engagement ball 30 is provided inside the guide hole 17 so that a distance between the pushing portion 35 and the axis decreases upward. The position of the piston 10 is detected by electrically or electronically detecting movement of the detection rod 21 by the switch 20.

In the second aspect, the following functions and effects are provided.

When the piston is raised from a lowered position to a raised position, a gap is created between the guide hole of the piston and an outer peripheral surface of the holding rod, and the gap allows the engagement ball to move radially outward. As a result, the spring attached to the upper portion of the detection rod pushes the engagement ball radially outward via the cam surface of the detection rod, and the detection rod is lowered. In this way, the spring lowers the detection rod against the force biasing the operated component of the switch upward. As a result, the detection rod quickly operates the electric or electronic switch.

Meanwhile, when the piston is lowered from the raised position to the lowered position, the pushing portion of the piston raises the detection rod against the spring via the engagement ball and the cam surface. As a consequence, the operated component is raised by the above-mentioned force biasing the operated component upward. Thus, the detection rod quickly stops operating the electric or electronic switch.

If the detection rod having moved to the lowered position is pushed upward by an unexpected external force acting upward, for example, the spring attached to the upper portion of the detection rod receives the detection rod from above. This prevents the detection rod from erroneously stopping operating the switch. This allows the switch to reliably and quickly detect that the piston is at the predetermined raised position.

It is preferable to incorporate the following feature into the second aspect of the invention.

As shown in FIG. 7A and FIG. 7B, for example, the operated component 20b is hermetically inserted into the rod hole 19 so as to be biased upward and so as to be movable in the up-down direction.

In this arrangement, because the operated component is hermetically inserted into the rod hole, the operation of the detection rod is stabilized.

Advantageous Effects of Invention

In the present invention, it is possible to provide a cylinder device configured so that the position of a piston or the like is quickly detected.

BRIEF DESCRIPTION OF THE DRAWINGS

FIG. 6A is a diagram similar to FIG. 1. FIG. 6B is a diagram similar to FIG. 2.

FIG. 7A is a diagram similar to FIG. 6A. FIG. 7B is a diagram similar to FIG. 6B.

DESCRIPTION OF EMBODIMENTS

First Embodiment

Figure 1:
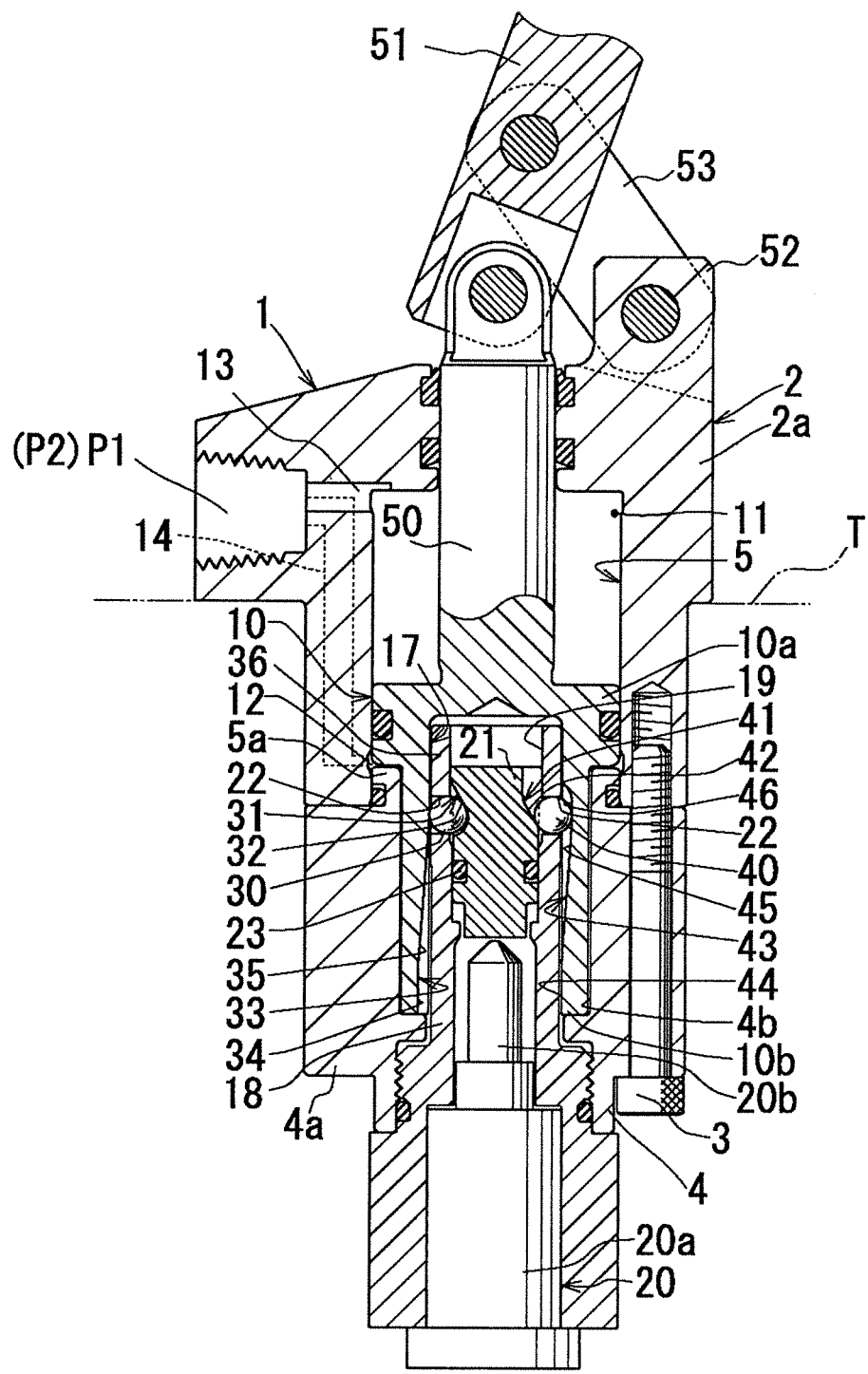
FIG. 1 shows First Embodiment of the present invention, and is a cross-section of a cylinder device having a position detection function in a release state.
Figure 2:
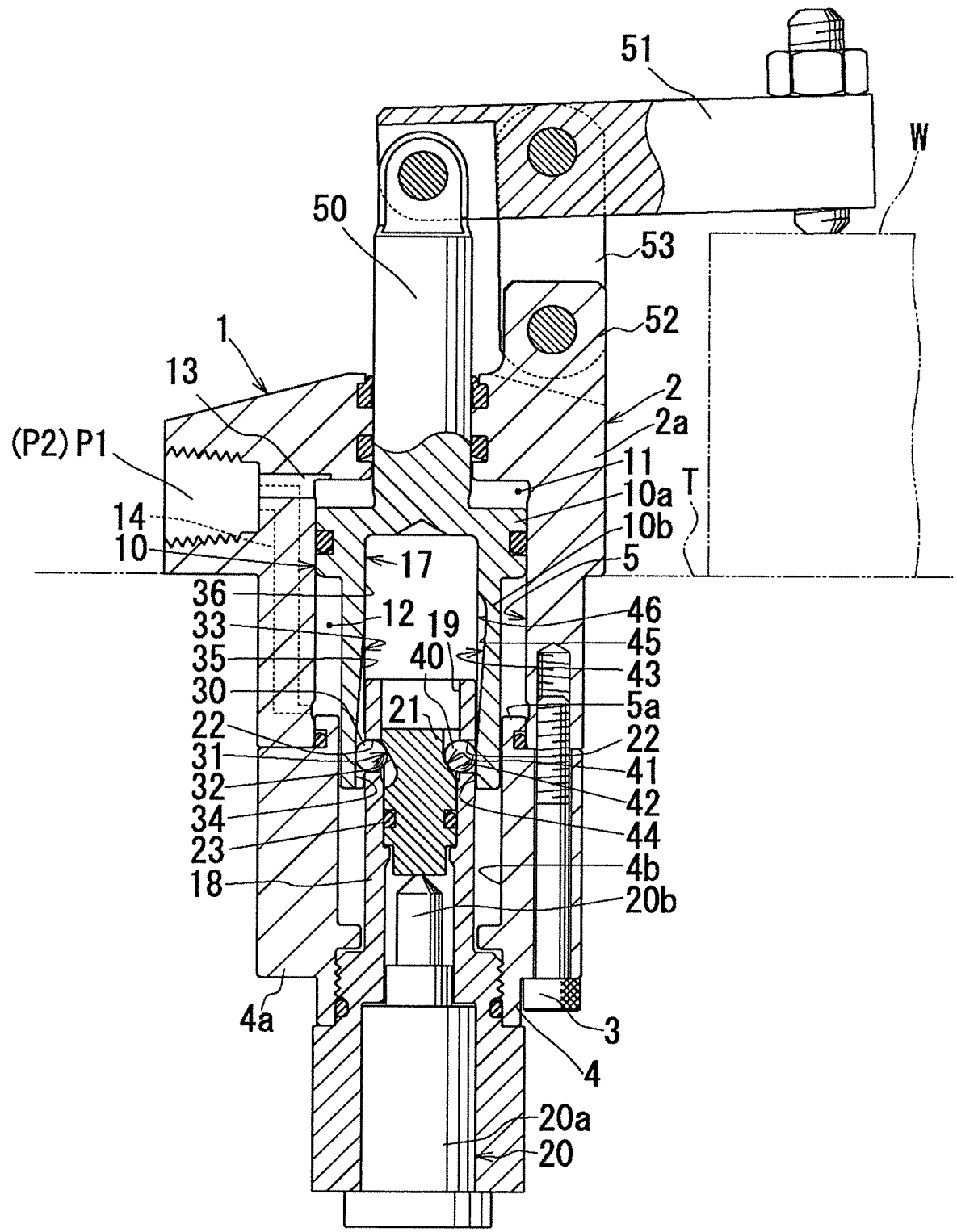
FIG. 2 is a cross-section of the cylinder device shown in FIG. 1, which is in a lock state.

FIG. 1 and FIG. 2 show First Embodiment of the present invention.

First Embodiment deals with a case where a cylinder device having a position detection function is applied to a link clamp, by way of example.

A housing 1 is attached to a table T functioning as a stationary stand. The housing 1 has: an upper housing 2; and a lower housing 4 fixed to the upper housing 2 via a bolt 3. An upper wall 2a is provided at an upper portion of the upper housing 2, and a lower wall 4a is provided at a lower portion of the lower housing 4.

A piston 10 is hermetically inserted ascendably and descendably (so as to be ascendable and descendable) into a cylinder bore 5 provided in the upper housing 2. The piston 10 includes: a piston main body 10a; and a guide cylinder 10b protruding downward from the piston main body 10a. The guide cylinder 10b is inserted into a cylindrical bore 4b of the lower housing 4. A release chamber 11 is provided above the piston main body 10a, and a lock chamber 12 is provided below the piston main body 10a. A first supply and discharge port P1 provided at the upper wall 2a is communicatively connected to the release chamber 11 via a first supply and discharge passage 13. A second supply and discharge port P2 provided at the upper wall 2a is communicatively connected to the lock chamber 12 via a second supply and discharge passage 14.

A guide hole 17 is provided inside the guide cylinder 10b of the piston 10, and the guide hole 17 opens downward. A holding rod 18 to be held in the guide hole 17 is provided to protrude upward from the lower wall 4a of the housing 1. The holding rod 18 has a rod hole 19 extending in an up-down direction. A casing 20a of an electric or electronic limit switch (switch) 20 is attached to a lower portion of the rod hole 19.

An operated component 20b is provided to protrude upward from the casing 20a of the limit switch 20. The operated component 20b is inserted into a middle-lower portion of the rod hole 19 so as to be movable in the up-down direction. A spring (not illustrated) is provided inside the casing 20a. The spring functions as a means for generating a force biasing the operated component 20b upward. The means for biasing the operated component 20b upward may be an elastic member such as rubber, or may be pressure fluid such as pressurized oil or compressed air, instead of the spring mentioned by way of example.

A detection rod 21 is hermetically inserted into a middle-upper portion of the rod hole 19 via a sealing member 23 so as to be movable in the up-down direction. The detection rod 21 is capable of coming into contact with an upper portion of the operated component 20b.

At an upper portion of the holding rod 18, a plurality of support holes 22, 22 are provided radially at predetermined intervals in a circumferential direction of the rod 18. A first engagement ball 30 and a second engagement ball 40 are respectively inserted into the support holes 22, 22 so that the balls 30 and 40 are movable radially.

A first cam groove 31 is provided at an outer periphery of the detection rod 21 so that the distance between the first cam groove 31 and the axis of the detection rod 21 increases upward. A first cam surface 32 is provided on a peripheral wall of the first cam groove 31. The first cam surface 32 is configured to be in contact with the first engagement ball 30.

A first guide groove 33 extending in the up-down direction is provided inside the guide hole 17. The first guide groove 33 includes a large diameter portion 34, a first pushing portion 35, and a small diameter portion 36 arranged in this order from bottom to top. The large diameter portion 34 and the small diameter portion 36 each extends in the up-down direction in a straight manner, i.e., without a change in the distance from the axis. The first pushing portion 35 is designed so that the distance between the first pushing portion 35 and the axis of the detection rod 21 decreases upward. The large diameter portion 34, the first pushing portion 35, and the small diameter portion 36 are configured to be in contact with the first engagement ball 30.

Meanwhile, a second cam groove 41 is provided at the outer periphery of the detection rod 21 so that the distance between the second cam groove 41 and the axis of the detection rod 21 decreases upward. A second cam surface 42 is provided on a peripheral wall of the second cam groove 41. The second cam surface 42 is configured to be in contact with the second engagement ball 40.

A second guide groove 43 extending in the up-down direction is provided inside the guide hole 17. The second guide groove 43 includes a small diameter portion 44, a second pushing portion 45, and a large diameter portion 46 arranged in this order from bottom to top. The small diameter portion 44 and the large diameter portion 46 each extends in the up-down direction in a straight manner, i.e., without a change in the distance from the axis. The second pushing portion 45 is designed so that the distance between the second pushing portion 45 and the axis of the detection rod 21 increases upward. The small diameter portion 44, the second pushing portion 45, and the large diameter portion 46 are configured to be in contact with the second engagement ball 40.

In this embodiment, the first cam surface 32 and the second cam surface 42 are provided so as to be substantially leveled with each other and so as to be opposed to each other. Furthermore, the first pushing portion 35 and the second pushing portion 45 are provided so as to be substantially leveled with each other and so as to be opposed to each other.

An output rod 50 is provided to protrude upward from an upper portion of the piston main body 10a. The output rod 50 is hermetically inserted into the upper wall 2a of the upper housing 2 so as to be movable in the up-down direction. A left end portion of a clamp arm 51 is connected to an upper portion of the output rod 50 so that the clamp arm 51 is rotatable in a vertical plane. A pivotably supporting portion 52 is provided to protrude upward from an upper right portion of the upper wall 2a, and a base end portion of a link component 53 is connected to an upper portion of the pivotably supporting portion 52 in a rotatable manner. An intermediate portion of the clamp arm 51, which is between its opposite end portions in its longitudinal direction, is connected to a distal end portion of the link component 53 in a rotatable manner.

The above-described cylinder device operates as follows, as shown in FIG. 1 and FIG. 2.

In the release state shown in FIG. 1, pressurized oil functioning as pressure fluid has been discharged from the lock chamber 12 and pressurized oil has been supplied to the release chamber 11. The piston 10 having lowered by the pressurized oil in the release chamber 11 is received by a step portion 5a from below, which is provided between the cylinder bore 5 and the cylindrical bore 4b.

The small diameter portion 36 of the first guide groove 33 pushes the first cam surface 32 upward via the first engagement ball 30, and thereby the detection rod 21 has been moved to a raised position. Due to this, the operated component 20b of the limit switch 20 has been moved to its upper limit position by the spring in the casing 20a, and therefore the limit switch 20 detects that the piston 10 is at its lower limit position.

To cause the cylinder device to transition from the release state in FIG. 1 to a lock state in FIG. 2 for locking, pressurized oil is discharged from the release chamber 11 and pressurized oil is supplied to the lock chamber 12, in the cylinder device in the release state. As a result, the pressurized oil in the lock chamber 12 raises the piston 10. Simultaneously with this, the second pushing portion 45 of the second guide groove 43 pushes down the second cam surface 42 of the detection rod 21 via the second engagement ball 40, and therefore the detection rod 21 is lowered. Due to this, the detection rod 21 pushes down the operated component 20b of the limit switch 20 against the biasing force of the spring in the casing 20a. As a result, the limit switch 20 reliably and quickly detects that the piston 10 is at a predetermined raised position.

To cause the cylinder device to transition from the locking state in FIG. 2 to the release state in FIG. 1 for releasing, pressurized oil is discharged from the lock chamber 12 and pressurized oil is supplied to the release chamber 11, in the cylinder device in the lock state. Then, the piston 10 is first lowered by the pressurized oil in the release chamber 11. Simultaneously with this, the first pushing portion 35 of the first guide groove 33 pushes the first engagement ball 30 radially inward, and the first engagement ball 30 pushes up the detection rod 21 via the first cam surface 32. Consequently, as shown in FIG. 1, a lower portion of the piston 10 is received by the step portion 5a, and the operated component 20b of the limit switch 20 is raised to its upper limit position by the spring (not illustrated) in the casing 20a. As a result, the limit switch 20 reliably and quickly detects that the piston 10 is at the predetermined lowered position.

First Embodiment of the present invention provides the following functions and effects.

When the piston 10 is raised from the lowered position to the raised position, the second pushing portion 45 of the piston 10 lowers the detection rod 21 via the second engagement ball 40 and the second cam surface 42. As a result, the detection rod 21 quickly operates the electric or electronic limit switch 20.

Meanwhile, when the piston 10 is lowered from the raised position to the lowered position, the first pushing portion 35 of the piston 10 raises the detection rod 21 via the first engagement ball 30 and the first cam surface 32. As a result, the detection rod 21 quickly stops operating the electric or electronic limit switch 20.

If the detection rod 21 having moved to the lowered position is pushed upward by an unexpected external force acting upward, for example, the small diameter portion 44 of the second guide groove 43 of the piston 10 receives the detection rod 21 from above, via the second engagement ball 40 and the second cam surface 42. This prevents the detection rod 21 from erroneously stops operating the limit switch 20. This allows the limit switch 20 to reliably and quickly detect that the piston 10 is at the predetermined raised position. Because the limit switch 20 is an electric or electronic limit switch, it has quick responsivity. Due to this, the limit switch 20 quickly detects that the piston 10 is at the predetermined lowered position and quickly detects that the piston 10 is at the predetermined raised position.

First Modification of First Embodiment

Figure 3:
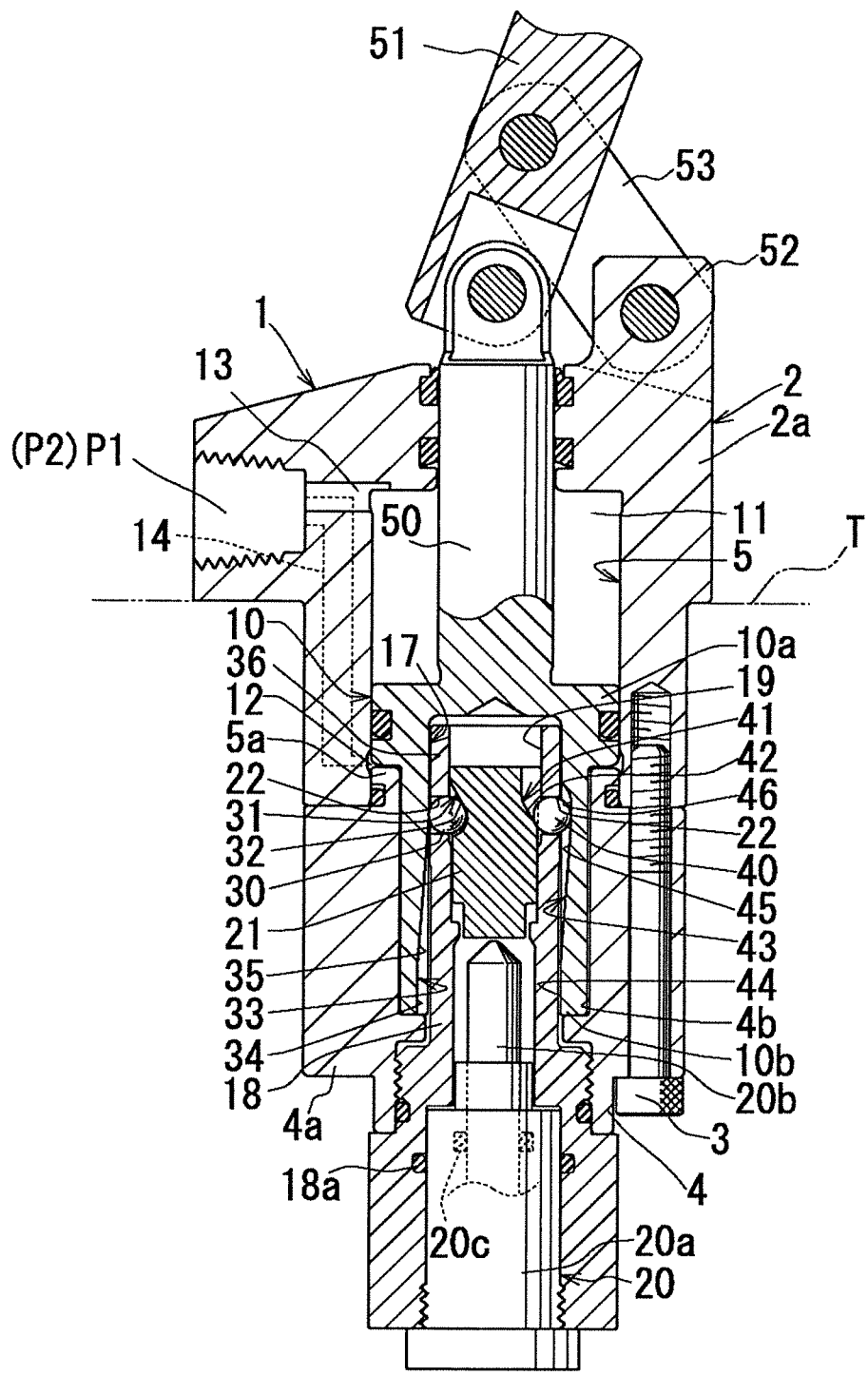
FIG. 3 shows First Modification of First Embodiment of the present invention, and is a diagram similar to FIG. 1.
Figure 4:
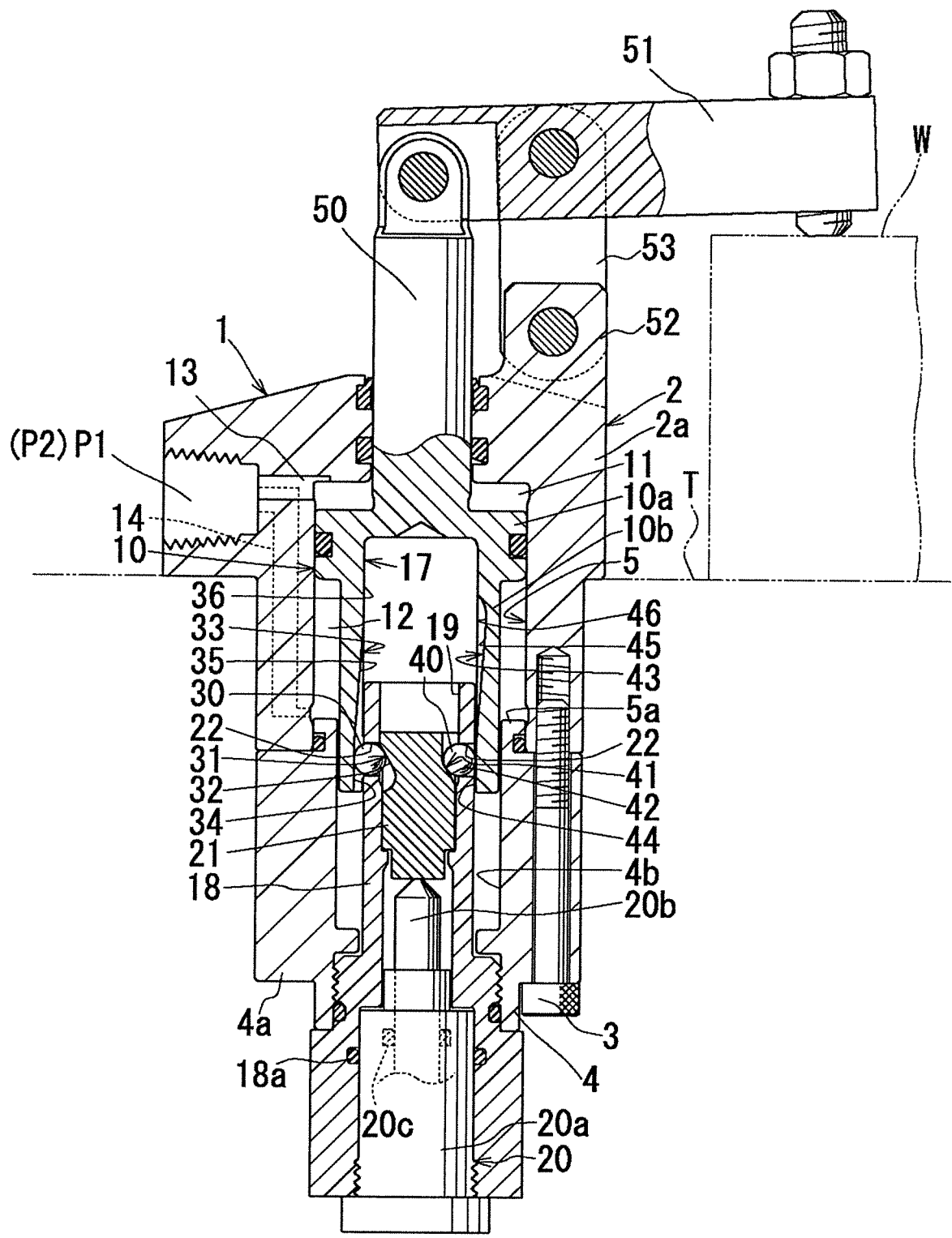
FIG. 4 is a cross-section of the cylinder device shown in FIG. 3, which is in the lock state.

FIG. 3 and FIG. 4 show First Modification of First Embodiment of the present invention. In First Modification, the components the same as or similar to the components in First Embodiment are given the same reference numerals, in principle.

First Modification is different from First Embodiment in the following points.

While in First Embodiment described above, the detection rod 21 is hermetically inserted into the middle-upper portion of the rod hole 19 via the sealing member 23, the sealing member 23 is not provided in First Modification. That is, the sealing member 23 is omitted. In this arrangement, when pressurized oil is supplied to the lock chamber 12, the pressurized oil in the lock chamber 12 pushes the detection rod 21 from above and from below. The pushing force from above and the pushing force from below are in balance because of the absence of the sealing member 23.

In First Modification, the casing 20a of the limit switch 20 is hermetically attached to a lower portion of the rod hole 19 via a sealing member 18a. Furthermore, the operated component 20b is hermetically inserted into the casing 20a of the limit switch 20 via a sealing member 20c so as to be movable in the up-down direction. Due to the sealing members 18a and 20c, the operated component 20b is hermetically disposed in the rod hole 19. Thus, the operated component 20b is hermetically inserted into the rod hole 19 so as to be biased upward and so as to be movable in the up-down direction. In this arrangement, because the operated component 20b is hermetically disposed in the rod hole 19, it is more likely that the pushing forces of the pressurized oil in the lock chamber 12 applied to the detection rod 21 from the above and from below are kept in balance. As a result, the operation of the detection rod 21 is stabilized.

How the cylinder device of First Modification operates is the same as that of the cylinder device of First Embodiment.

Second Modification of First Embodiment

Figure 5:
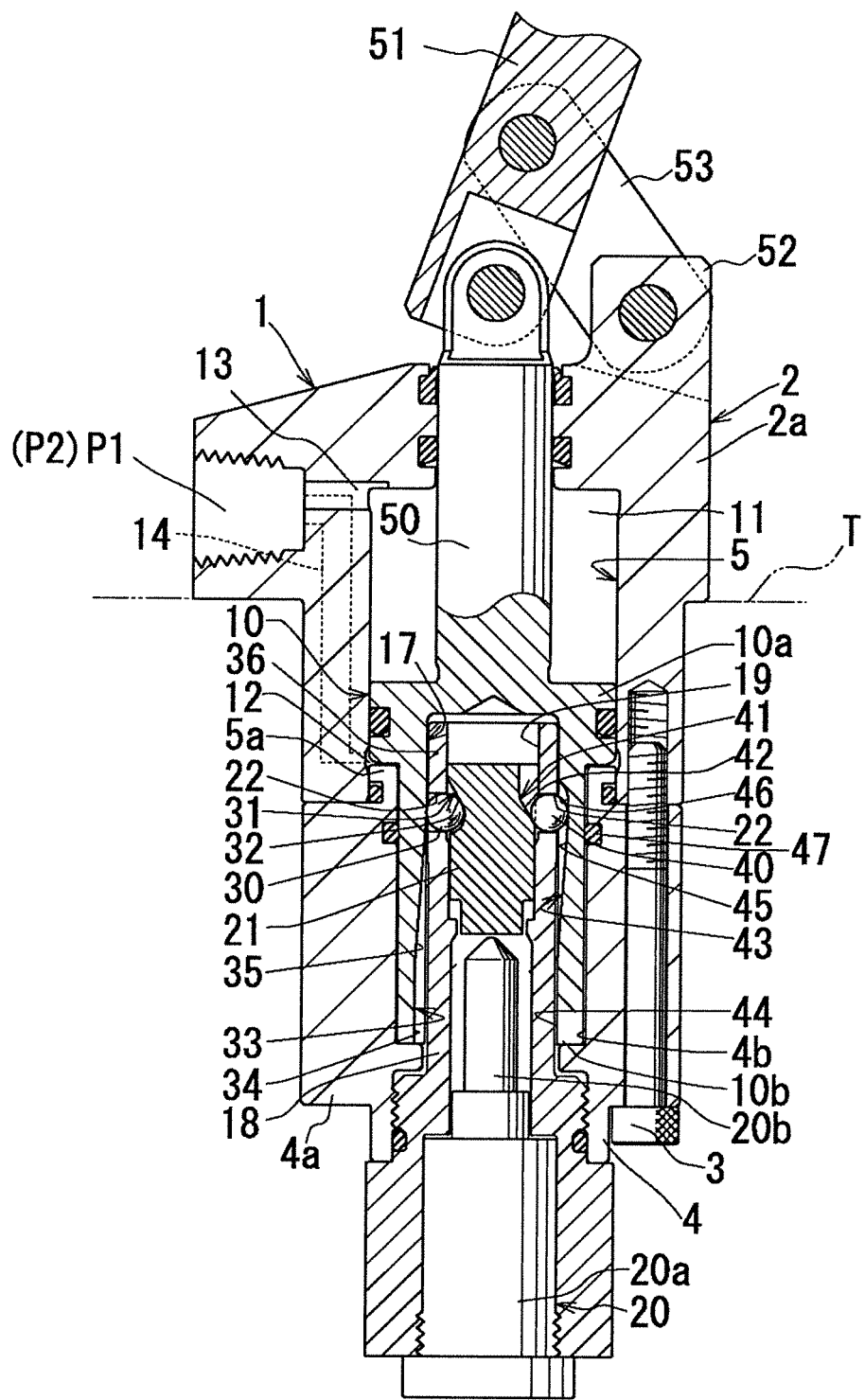
FIG. 5 shows Second Modification of First Embodiment of the present invention, and is a diagram similar to FIG. 1.

FIG. 5 shows Second Modification of First Embodiment of the present invention. In Second Modification, the components the same as or similar to the components in First Embodiment are given the same reference numerals, in principle.

Second Modification is different from First Embodiment in the following points.

A sealing member 47 is attached between an inner peripheral surface of the cylindrical bore 4b of the lower housing 4 and an outer peripheral surface of the guide cylinder 10b.

In this arrangement, pressurized oil supplied to the lock chamber 12 is prevented from entering into a cylindrical bore of the piston 10 by the sealing member 47 attached to a gap between the inner peripheral surface of the cylindrical bore 4b of the lower housing 4 and the outer peripheral surface of the guide cylinder 10b. Because the pressurized oil is prevented from entering into the cylindrical bore of the piston 10, the detection rod 21 operates without affected by the pressure of the pressurized oil. This allows the piston 10 to move the detection rod 21 via the first engagement ball 30 and the like with a smaller force, when the piston 10 moves in the up-down direction.

How the cylinder device of Second Modification operates is the same as that of the cylinder device of First Embodiment.

Second Embodiment

Figure 6A:
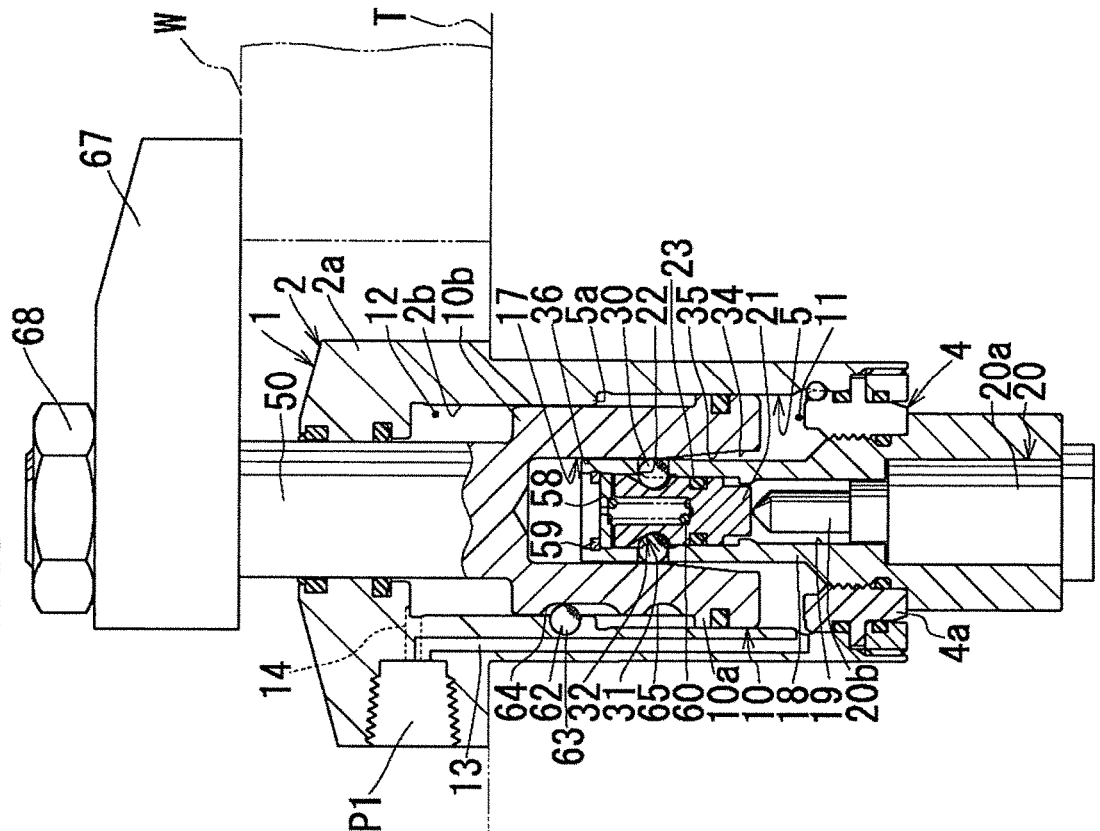
FIG. 6A and FIG. 6B show Second Embodiment of the present invention.
Figure 6B:
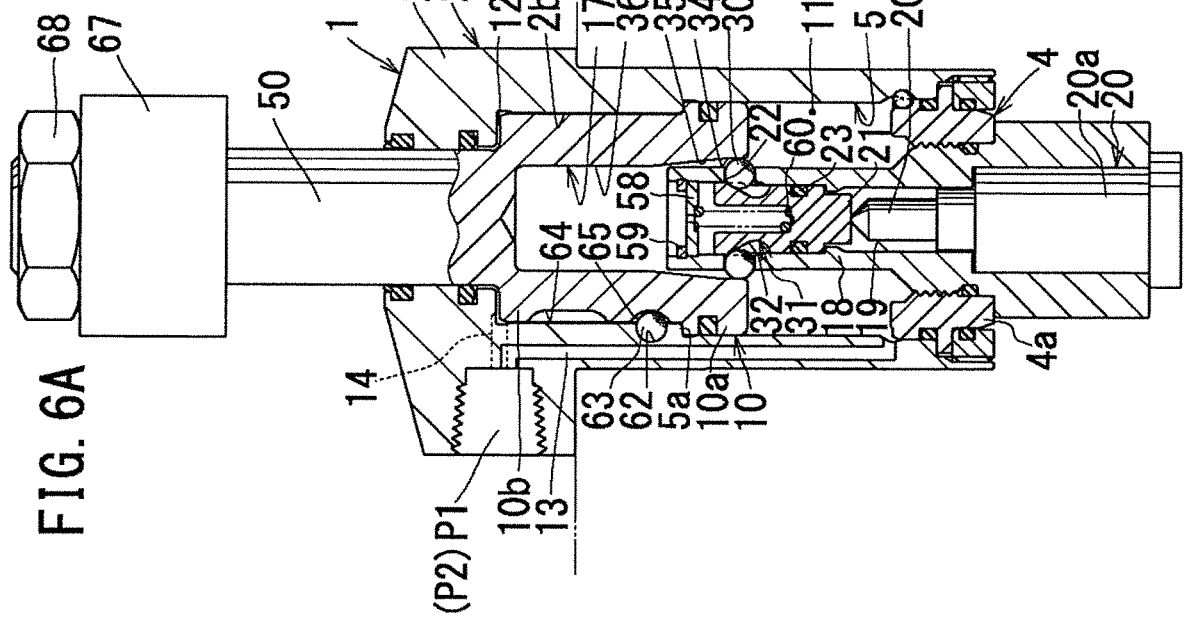

FIG. 6A and FIG. 6B show Second Embodiment of the present invention. Second Embodiment deals with a case where the cylinder device having a position detection function is applied to a rotary clamp, by way of example. In Second Embodiment, the components the same as or similar to the components in First Embodiment are given the same reference numerals, in principle.

Second Embodiment is different from First Embodiment in the following points.

In the upper housing 2, the cylinder bore 5 and a cylindrical bore 2b are provided so as to be arranged in this order from bottom to top. A step portion 5a is provided between the cylinder bore 5 and the cylindrical bore 2b. The piston main body 10a of the piston 10 is hermetically inserted ascendably and descendably into the cylinder bore 5, and the guide cylinder 10b protruding upward from the piston main body 10a is inserted into the cylindrical bore 2b. The release chamber 11 is provided below the piston main body 10a, and the lock chamber 12 is provided above the piston main body 10a. The first supply and discharge port P1 provided at the upper wall 2a of the upper housing 2 is communicatively connected to the release chamber 11 via the first supply and discharge passage 13. The second supply and discharge port P2 provided at the upper wall 2a is communicatively connected to the lock chamber 12 via the second supply and discharge passage 14.

A spring receiver 58 is fixed, by a retaining ring 59, to an upper portion of the rod hole 19 of the holding rod 18. A spring 60 is attached between the spring receiver 58 and the detection rod 21, and the detection rod 21 is biased downward by the biasing force of the spring 60. At the outer periphery of the detection rod 21, a plurality of cam grooves 31 are provided at predetermined intervals in the circumferential direction. A cam surface 32 is provided on a peripheral wall of each cam groove 31. An engagement ball 30 is inserted into each support hole 22 bored laterally through a peripheral wall of the holding rod 18.

The spring 60 is selected so that the elastic force of the spring 60 is larger than the elastic force of the spring (not illustrated) biasing the operated component 20b of the limit switch 20 upward.

The guide hole 17 of the piston 10 includes a large diameter portion 34, a pushing portion 35, and a small diameter portion 36 arranged in this order from bottom to top. The large diameter portion 34 and the small diameter portion 36 each extends in the up-down direction in a straight manner, i.e., without a change in the distance from the axis. The pushing portion 35 is designed so that the distance between the pushing portion 35 and the axis of the piston 10 decreases upward.

A recess 62 is provided on a peripheral wall of the cylinder bore 5, and a guide ball 63 is disposed in the recess 62. A linear groove 64 extending in the up-down direction is provided at an outer periphery of the guide cylinder 10b of the piston 10, and a spiral rotation groove 65 is provided so as to be continuous with a lower end of the linear groove 64. The linear groove 64 and the rotation groove 65 are configured to receive the guide ball 63 inserted therein.

The output rod 50 provided to protrude upward from the guide cylinder 10b is hermetically inserted into the upper wall 2a of the housing 1 so as to be movable in the up-down direction. A clamp arm 67 is fixed to an upper portion of the output rod 50 via a nut 68.

As shown in FIG. 6A and FIG. 6B, the above-described cylinder device operates as follows.

In the release state shown in FIG. 6A, pressurized oil has been discharged from the lock chamber 12 and pressurized oil has been supplied to the release chamber 11. A top surface of the piston main body 10a having been raised by the pressurized oil in the release chamber 11 is received by the step portion 5a. Meanwhile, the spring 60 installed in the rod hole 19 of the holding rod 18 pushes the engagement balls 30 radially outward via the cam surfaces 32 of the detection rod 21, and has moved the detection rod 21 to its lower limit position. As a result, the detection rod 21 pushes the operated component 20b of the limit switch 20 downward, and the limit switch 20 detects that the piston 10 is at its upper limit position.

To cause the cylinder device to transition from the release state in FIG. 6A to a lock state in FIG. 6B for locking, pressurized oil is discharged from the release chamber 11 and pressurized oil is supplied to the lock chamber 12, in the cylinder device in the release state. As a result, at first, the piston 10 is lowered while rotating 90 degrees in a clockwise direction in a plan view along the rotation groove 65, and then the piston 10 is lowered straight down along the linear groove 64. Simultaneously with this, the pushing portion 35 of the piston 10 pushes up the cam surfaces 32 of the detection rod 21 via the engagement balls 30, and the detection rod 21 is raised against the biasing force of the spring 60. As a consequence, the operated component 20b of the limit switch 20 is raised by the biasing force of the spring (not illustrated) in the casing 20a. In this way, as shown in FIG. 6B, the clamp arm 67 presses a workpiece W from the above, and the operated component 20b of the limit switch 20 is raised by the spring. Consequently, the limit switch 20 detects that the piston 10 is at a predetermined lowered position.

To cause the cylinder device to transition from the lock state in FIG. 6B to the release state in FIG. 6A for releasing, pressurized oil is discharged from the lock chamber 12 and pressurized oil is supplied to the release chamber 11, in the cylinder device in the lock state. As a result, at first, the piston 10 is raised straight up, and then the piston 10 is raised while rotating 90 degrees in a counterclockwise direction in a plan view. Then, a gap is created between an outer peripheral surface of the holding rod 18 and the guide hole 17, which allows the engagement balls 30 to move radially outward. Simultaneously with this, the spring 60 attached to an upper portion of the detection rod 21 pushes the engagement balls 30 radially outward via the cam surfaces 32 of the detection rod 21, and the force from the pressurized oil in the release chamber 11 and the biasing force of the spring 60 lower the detection rod 21. In this way, as shown in FIG. 6A, the top surface of the piston main body 10a is received by the step portion 5a, and the operated component 20b of the limit switch 20 is lowered against the spring (not illustrated) in the casing 20a. Consequently, the limit switch 20 detects that the piston 10 is at its upper limit position.

Second Embodiment of the present invention provides the following functions and effects.

When the piston 10 is raised from the lowered position to the raised position, a gap is created between the holding rod 18 and the guide hole 17, and the gap allows the engagement balls 30 to move radially outward. As a result, the spring 60 attached to the upper portion of the detection rod 21 pushes the engagement balls 30 radially outward via the cam surfaces 32 of the detection rod 21, and the detection rod 21 is lowered. In this way, the spring 60 attached to the upper portion of the detection rod 21 lowers the detection rod 21 against the force biasing the operated component 20b of the limit switch 20 upward. As a result, the detection rod 21 quickly operates the electric or electronic limit switch 20.

Meanwhile, when the piston 10 is lowered from the raised position to the lowered position, the pushing portion 35 of the piston 10 raises the detection rod 21 via the engagement balls 30 and the cam surfaces 32. As a consequence, the detection rod 21 is raised by the spring biasing the operated component 20b upward, and the detection rod 21 quickly stops operating the electric or electronic limit switch 20.

If the detection rod 21 having moved to the lowered position is pushed upward by an unexpected external force acting upward, for example, the spring 60 attached to the upper portion of the detection rod 21 receives the detection rod 21 from above. This prevents the detection rod 21 from erroneously stopping operating the limit switch 20. This allows the limit switch 20 to reliably and quickly detect that the piston 10 is at the predetermined raised position. Because the limit switch 20 is an electric or electronic limit switch, it has quick responsivity. Due to this, the limit switch 20 quickly detects that the piston 10 is at the predetermined lowered position and quickly detects that the piston 10 is at the predetermined raised position.

Modification of Second Embodiment

Figure 7A:
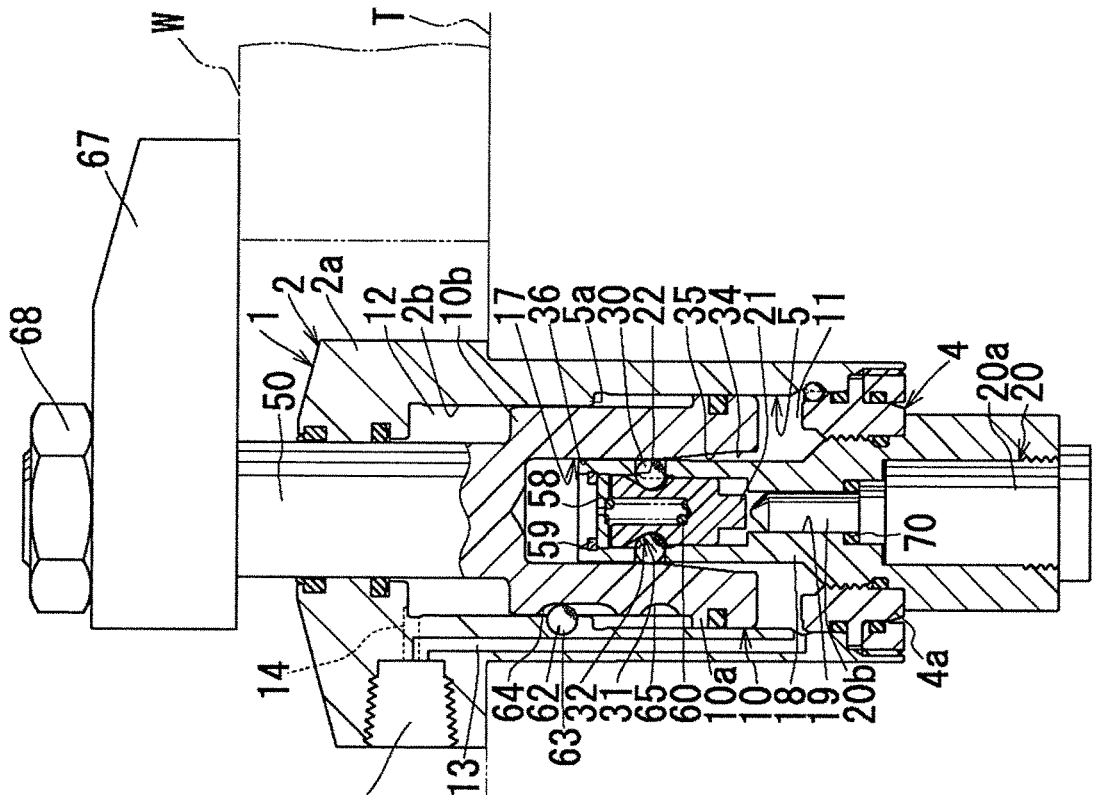
FIG. 7A and FIG. 7B show a modification of Second Embodiment of the present invention.
Figure 7B:
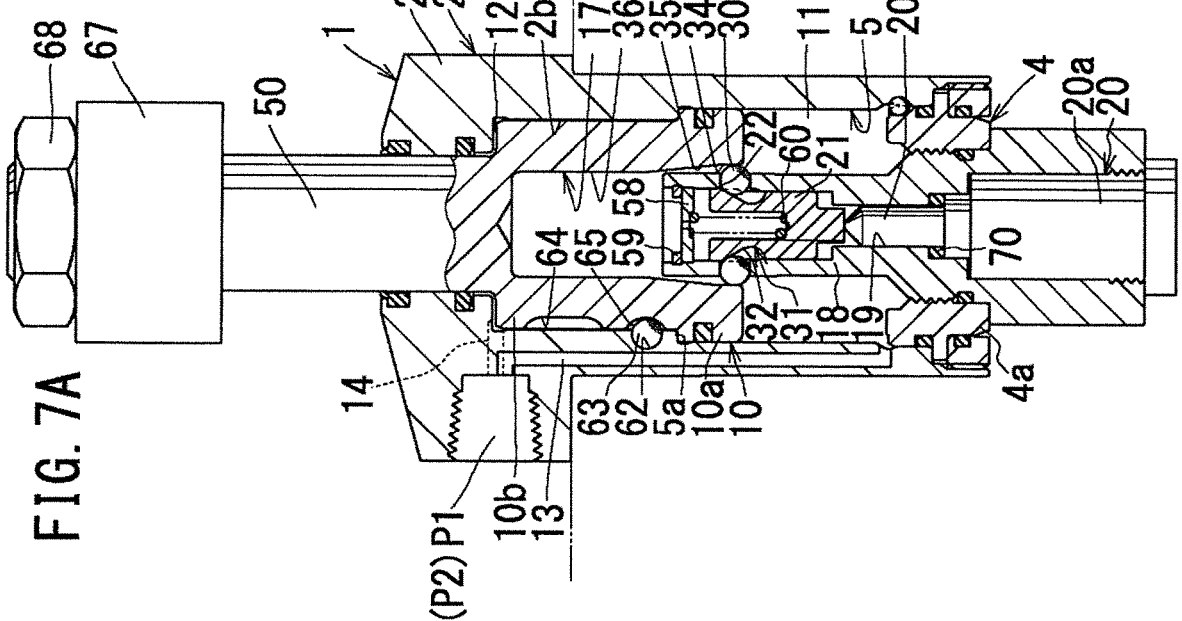

FIG. 7A and FIG. 7B show a modification of Second Embodiment of the present invention. In this modification, the components the same as or similar to the components in Second Embodiment are given the same reference numerals, in principle.

This modification is different from Second Embodiment in the following points.

A sealing member 70 is attached between an outer peripheral surface of the operated component 20b and an inner peripheral surface of the rod hole 19 of the holding rod 18. Thus, the operated component 20b is hermetically inserted into the rod hole 19 so as to be biased upward and so as to be movable in the up-down direction. In this arrangement, because the operated component 20b is hermetically disposed in the rod hole 19, the operation of the detection rod 21 is stabilized.

The above-described embodiments and their modifications are changeable as follows.

Instead of the pressurized oil described by way of example, pressure fluid may be liquid other than the pressurized oil, or may be gas such as compressed air.

Instead of the arrangement in which the piston 10 is driven in a reciprocating manner by pressurized oil supplied to/discharged from the release chamber 11 and the lock chamber 12, the piston 10 may be configured to be driven for locking by a lock spring installed in the lock chamber 12 and to be driven for releasing by pressure fluid supplied to/discharged from the release chamber 11. Alternatively, instead of the arrangement in which the piston 10 is driven in a reciprocating manner by pressurized oil supplied to/discharged from the release chamber 11 and the lock chamber 12, the piston 10 may be configured to be driven for releasing by a release spring installed in the release chamber 11 and to be driven for locking by pressure fluid supplied to/discharged from the lock chamber 12. Furthermore, instead of the hydraulic cylinder described by way of example, a pneumatic cylinder or an electrical actuator may be used.

In First Modification of First Embodiment shown in FIG. 3 and FIG. 4, instead of the arrangement in which the sealing member 18a and the sealing member 20c are attached, the sealing member 70 may be attached between the outer peripheral surface of the operated component 20b and the inner peripheral surface of the rod hole 19 of the holding rod 18, as described in the modification of Second Embodiment, which is shown in FIG. 7A and FIG. 7B.

In the modification of Second Embodiment, which is shown in FIG. 7A and FIG. 7B, instead of the arrangement in which the sealing member 70 is attached, the sealing member 18a and the sealing member 20c may be attached to a portion of the limit switch 20, as shown in FIG. 3 and FIG. 4.

The switch may be a non-contact switch such as a proximity switch, instead of the contact limit switch 20 described by way of example. Furthermore, the switch does not have to be an electrical switch, and may be an electronic switch using a semiconductor device, for example.

Moreover, it is a matter of course that other changes or alterations can be made on the present invention within the scope of envisagement of one skilled in the art.

REFERENCE SIGNS LIST

1: housing; 4a: lower wall; 4b: cylindrical bore; 10: piston; 10a: piston main body; 10b: guide cylinder; 17: guide hole; 18: holding rod; 19: rod hole; 20: switch (limit switch); 20b: operated component; 21: detection rod; 22: support hole; 30: first engagement ball; 32: first cam surface; 35: first pushing portion; 40: second engagement ball; 42: second cam surface; 45: second pushing portion; 47: sealing member; 60: spring.

The invention claimed is:

1. A cylinder device comprising:
a piston (10) inserted into a housing (1);
a guide hole (17) provided in the piston (10) so as to open downward;
a holding rod (18) provided to protrude upward from a lower wall (4a) of the housing (1) so that the holding rod (18) is held in the guide hole (17);
an electric or electronic switch (20) fixed to a middle-lower portion of a rod hole (19), which is provided in the holding rod (18) so as to extend in an up-down direction;
a detection rod (21) inserted ascendably and descendably into a middle-upper portion of the rod hole (19), the detection rod (21) provided to detect a position of the piston (10);
a plurality of support holes (22, 22) provided radially in the holding rod (18) at predetermined intervals with respect to a circumferential direction of the holding rod (18);
a first engagement ball (30) and a second engagement ball (40) respectively inserted into the support holes (22, 22) so as to be movable;
a first cam surface (32) configured to be in contact with the first engagement ball (30), the cam surface (32) provided at an outer periphery of the detection rod (21) so that a distance between the first cam surface (32) and an axis of the detection rod (21) increases upward;
a first pushing portion (35) configured to be in contact with the first engagement ball (30), the first pushing portion (35) provided inside the guide hole (17) so that a distance between the first pushing portion (35) and the axis decreases upward;
a second cam surface (42) configured to be in contact with the second engagement ball (40), the second cam surface (42) provided at the outer periphery of the detection rod (21) so that a distance between the second cam surface (42) and the axis decreases upward; and
a second pushing portion (45) configured to be in contact with the second engagement ball (40), the second pushing portion (45) provided inside the guide hole (17) so that a distance between the second pushing portion (45) and the axis increases upward, wherein
the position of the piston (10) is detected by electrically or electronically detecting movement of the detection rod (21) by the switch (20).

2. The cylinder device according to claim 1, wherein the switch (20) includes an operated component (20b) hermetically inserted into the rod hole (19) so as to be biased upward and so as to be movable in the up-down direction.

3. The cylinder device according to claim 2, wherein:
the piston (10) includes a piston main body (10a) and a guide cylinder (10b) protruding downward from the piston main body (10a); and
a sealing member (47) is attached between an inner peripheral surface of a cylindrical bore (4b) of the housing (1) and an outer peripheral surface of the guide cylinder (10b).

4. The cylinder device according to claim 1, wherein:
the piston (10) includes a piston main body (10a) and a guide cylinder (10b) protruding downward from the piston main body (10a); and
a sealing member (47) is attached between an inner peripheral surface of a cylindrical bore (4b) of the housing (1) and an outer peripheral surface of the guide cylinder (10b).

5. A cylinder device comprising:
a piston (10) inserted into a housing (1);
a guide hole (17) provided in the piston (10) so as to open downward;

a holding rod (18) provided to protrude upward from a lower wall (4*a*) of the housing (1) so that the holding rod (18) is held in the guide hole (17);

an electric or electronic switch (20) fixed to a middle-lower portion of a rod hole (19), which is provided in the holding rod (18) so as to extend in an up-down direction, the switch (20) including an operated component (20*b*) inserted into the rod hole (19) so as to be biased upward and so as to be movable in the up-down direction;

a detection rod (21) inserted ascendably and descendably into a middle-upper portion of the rod hole (19), the detection rod (21) provided to detect a position of the piston (10);

a spring (60) attached to an upper portion of the rod hole (19) and configured to bias the detection rod (21) downward against a force biasing the operated component (20*b*) upward;

a support hole (22) provided radially in the holding rod (18);

an engagement ball (30) inserted into the support hole (22) so as to be movable;

a cam surface (32) configured to be in contact with the engagement ball (30), the cam surface (32) provided at an outer periphery of the detection rod (21) so that a distance between the cam surface (32) and an axis of the detection rod (21) increases upward; and a pushing portion (35) configured to be in contact with the engagement ball (30), the pushing portion (35) provided inside the guide hole (17) so that a distance between the pushing portion (35) and the axis decreases upward, wherein the position of the piston (10) is detected by electrically or electronically detecting movement of the detection rod (21) by the switch (20); and wherein the operated component (20*b*) is hermetically inserted into the rod hole (19) so as to be biased upward and so as to be movable in the up-down direction.

* * * * *